United States Patent
Avramidis

(10) Patent No.: US 9,309,351 B2
(45) Date of Patent: Apr. 12, 2016

(54) STYRENE-ACRYLIC-BASED BINDERS AND METHODS OF PREPARING AND USING SAME

(75) Inventor: Kostas S. Avramidis, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 896 days.

(21) Appl. No.: 13/324,521

(22) Filed: Dec. 13, 2011

(65) Prior Publication Data

US 2012/0152459 A1    Jun. 21, 2012

Related U.S. Application Data

(60) Provisional application No. 61/423,725, filed on Dec. 16, 2010.

(51) Int. Cl.

| | |
|---|---|
| *B32B 37/12* | (2006.01) |
| *C09J 163/00* | (2006.01) |
| *C08L 63/00* | (2006.01) |
| *C08G 59/22* | (2006.01) |
| *C09J 125/14* | (2006.01) |
| *C09D 163/00* | (2006.01) |
| *C08F 212/08* | (2006.01) |

(52) U.S. Cl.
CPC ............... *C08G 59/223* (2013.01); *C08L 63/00* (2013.01); *C09D 163/00* (2013.01); *C09J 125/14* (2013.01); *C09J 163/00* (2013.01); *C08F 212/08* (2013.01)

(58) Field of Classification Search
CPC ..... C08F 220/14; C08F 212/08; C08F 220/06
USPC ..................................................... 524/558
See application file for complete search history.

(56) References Cited

U.S. PATENT DOCUMENTS

| | | | |
|---|---|---|---|
| 3,738,991 A | 6/1973 | Reed | |
| 4,032,487 A | 6/1977 | Columbus | |
| 4,077,932 A | 3/1978 | Columbus | |
| 5,100,948 A | 3/1992 | Aydin et al. | |
| 5,100,955 A | 3/1992 | Pons et al. | |
| 5,266,322 A | 11/1993 | Myers et al. | |

(Continued)

FOREIGN PATENT DOCUMENTS

| | | |
|---|---|---|
| EP | 0035332 | 9/1984 |
| EP | 0626397 | 11/1994 |

(Continued)

OTHER PUBLICATIONS

Acronal acrylic resins data sheet. Obtained online from http://www.dispersions-pigments.basf.us/p02/USWeb-Internet/en_GB/content/microsites/ on Dec. 14, 2014. No Author, no date.*

(Continued)

*Primary Examiner* — Michael A Salvitti
(74) *Attorney, Agent, or Firm* — Meunier Carlin & Curfman LLC

(57) ABSTRACT

Styrene-acrylic-based binder compositions and methods for their preparation and use are described herein. The binder compositions include a filler and a binder comprising a styrene-acrylic-based copolymer. In some embodiments, the copolymer has a gel content of less than 75%. In some embodiments, the copolymers can be derived from at least one crosslinkable monomer. The weight ratio of filler to binder in the compositions is at least 5:1.

29 Claims, 13 Drawing Sheets

(56) References Cited

U.S. PATENT DOCUMENTS

| | | | |
|---|---|---|---|
| 5,416,166 A * | 5/1995 | Yoo et al. | 525/286 |
| 5,422,218 A * | 6/1995 | Tong | 430/108.3 |
| 5,693,732 A * | 12/1997 | Sharma et al. | 526/263 |
| 5,741,844 A * | 4/1998 | Nass et al. | 524/523 |
| 6,001,907 A | 12/1999 | Huang | |
| 6,077,593 A | 6/2000 | Schlachter | |
| 6,409,860 B1 * | 6/2002 | Fickeisen et al. | 156/71 |
| 7,033,963 B2 | 4/2006 | Felegi, Jr. et al. | |
| 7,112,626 B1 * | 9/2006 | Fickeisen et al. | 524/560 |
| 7,252,888 B2 | 8/2007 | Osen et al. | |
| 7,309,556 B2 * | 12/2007 | McDougall et al. | 430/108.6 |
| 2003/0144400 A1 | 7/2003 | Osen et al. | |
| 2005/0131176 A1 | 6/2005 | Zhao | |
| 2005/0171276 A1 * | 8/2005 | Matsuda et al. | 524/572 |
| 2006/0111478 A1 * | 5/2006 | Hommer et al. | 524/5 |
| 2006/0178470 A1 | 8/2006 | Majolo et al. | |
| 2007/0039703 A1 * | 2/2007 | Lee et al. | 162/156 |
| 2007/0185256 A1 * | 8/2007 | Wulff et al. | 524/523 |
| 2007/0299180 A1 * | 12/2007 | Joecken | 524/376 |
| 2010/0040832 A1 * | 2/2010 | Herbert | 428/143 |

FOREIGN PATENT DOCUMENTS

| | | | |
|---|---|---|---|
| EP | 0792925 | | 9/1997 |
| WO | WO 03/027157 | * | 4/2003 |

OTHER PUBLICATIONS

Augustin et al., "Volatile Organic Compounds from Adhesives and their Contribution to Indoor Air Problems," AppNote Aug. 2000, Gerstel, pp. 1-8 (2000).

* cited by examiner

STYRENE-ACRYLIC-BASED BINDERS AND METHODS OF PREPARING AND USING SAME

CROSS-REFERENCE TO RELATED APPLICATIONS

This application claims priority to U.S. Provisional Application No. 61/423,725, filed Dec. 16, 2010, which is incorporated herein by reference in its entirety.

BACKGROUND

Adhesive compositions are formulated to adhere various substrates, including, for example, ceramics, metal, plastics, paper, leather, wood, textiles, and glass. Adhesive compositions suitable for industrial applications provide a high level of substrate adhesion and their performance is often regulated by standards set by international organizations including the American Society for Testing and Materials (ASTM) and the American National Standards Institute (ANSI). Typical components of approved adhesive compositions include binders, solvent carriers, and additives. Certain additives, such as fillers, are used to replace a portion of the binders to reduce the production costs of adhesive compositions. However, high ratios of fillers to binders can result in reduced bonding capabilities and failure to meet required performance standards.

SUMMARY

A binder composition is disclosed comprising a filler and a binder comprising a styrene-acrylic-based copolymer derived from styrene and a (meth)acrylate, said styrene-acrylic-based copolymer having a gel content of less than 75%, wherein the weight ratio of the filler to binder is at least 8:1. In some embodiments, the styrene-acrylic-based copolymer can be further derived from at least one crosslinkable monomer selected from the group consisting of acetoacetate monomers (e.g., acetoacetoxyethyl methacrylate), epoxy functionalized (meth)acrylate monomers (e.g., glycidyl methacrylate), and mixtures of these (e.g., acetoacetoxyethyl methacrylate and glycidyl methacrylate). A binder composition is also disclosed comprising a filler and a binder comprising a styrene-acrylic-based copolymer derived from styrene, a (meth)acrylate, and at least one crosslinkable monomer selected from the group consisting of acetoacetate monomers, epoxy functionalized (meth)acrylate monomers, and mixtures of these, wherein the weight ratio of the filler to binder is at least 5:1. The binder composition can have a filler to binder ratio of at least 8:1 and the styrene-acrylic-based copolymer can have a gel content of less than 75%. In some embodiments, the binder composition can have a gel content of less than 70% or less than 65%.

The (meth)acrylate used in the styrene-acrylic-based copolymer used in the binder composition can be selected, for example, from the group consisting of butyl acrylate, 2-ethylhexyl acrylate, ethyl acrylate, methyl methacrylate, methyl acrylate, and mixtures of these. In some examples, the styrene-acrylic-based copolymer is derived from 80% by weight or greater of styrene and the (meth)acrylate (e.g., from 90% by weight or greater or from 95% by weight or greater of styrene and the (meth)acrylate). The styrene-acrylic-based copolymer can be derived from 0.01% to 10% by weight (e.g., from 0.1 to 5% by weight) of the at least one crosslinkable monomer. In some examples, the styrene-acrylic-based copolymer can further comprise one or more additional monomers. For example, the one or more additional monomers can include crosslinkable functional groups that are capable of being crosslinked with the acetoacetate monomer, the epoxy functionalized (meth)acrylate monomer, or mixtures of these. In some examples, the one or more additional monomers include crosslinkable functional monomers selected from the group consisting of amide functionalized monomers, acid functionalized monomers, hydroxyl functionalized monomers, silanes, or mixtures of these. The crosslinkable functional monomers include, for example, amide functionalized monomers selected from the group consisting of acrylamide, methacrylamide, N-methylol acrylamide, or mixtures of these, and/or acid functionalized monomers selected from the group consisting of acrylic acid, methacrylic acid, itaconic acid, or mixtures of these. The binder compositions described herein can further include an external crosslinking agent. For example, the external crosslinking agent can include an amine, an alkyl amine salt, a diamine, a polyethyleneimine, a polypropyleneimine, a polyamine, a dihydrazide, or mixtures of these. The styrene-acrylic-based copolymer can include greater than 50% of the total polymer in the binder. In some examples, the styrene-acrylic-based copolymer is substantially free of mercaptosilane monomers or epoxysilane monomers. In some examples, the styrene-acrylic based copolymer is substantially free of alkoxylated monomers.

The binder compositions described herein can have a filler (e.g. calcium carbonate) to binder ratio of at least 10:1 or at least 12:1. In some examples, the binder compositions contain coalescing agents in an amount of less than 2.0% by weight of the binder composition (e.g., less than 1.5% by weight, less than 1.0% by weight, or less than 0.5% by weight).

Methods of preparing the binder compositions are also provided herein. The methods include co-polymerizing the monomers to form a binder comprising a styrene-acrylic-based copolymer and mixing the binder with filler to provide at least a 5:1 weight ratio or at least an 8:1 weight ratio of filler to binder. The styrene-acrylic-based copolymer can have a gel content of less than 75%. The co-polymerizing step can occur at a temperature of 70° C. or greater and can occur in the presence of a molecular weight regulator.

Aqueous dispersions are also disclosed that include water and a styrene-acrylic-based copolymer. The styrene-acrylic-based copolymer can be derived from styrene, a (meth)acrylate, acetoacetoxyethyl methacrylate, and glycidyl methacrylate. In some examples, the styrene-acrylic-based copolymer can be derived from 80% by weight or greater of styrene and the (meth)acrylate. For example, the styrene-acrylic-based copolymer can be derived from 90% by weight or greater of from 95% by weight or greater of styrene and the (meth) acrylate. In some examples, the styrene-acrylic-based copolymer is derived from 0.01% to 10% by weight of acetoacetoxyethyl methacrylate and glycidyl methacrylate or from 0.1 to 5% by weight of acetoacetoxyethyl methacrylate and glycidyl methacrylate. The styrene-acrylic-based copolymer can be derived from 0.01% to less than 5% by weight of glycidyl methacrylate. In some examples, the styrene-acrylic-based copolymer further comprises one or more additional monomers.

Also described herein are products comprising the binder compositions. For example, the binder compositions can be used for several applications, including adhesives, coatings, carpet backings, paints, foams, textiles, sound absorbing compounds, tape joint compounds, asphalt-aggregate mixtures, waterproofing membranes, and asphalt roofing compounds. In some examples, the product is an adhesive, such as, for example, a tile mastic. In some examples, the wet shear strength of the tile mastic is at least 50 psi according to ANSI A 136.1 (2009).

Methods of using these binder compositions, including methods of adhering a substrate to a surface, are also included. These methods include applying to a surface or to a substrate a binder composition comprising water, a filler, and a binder comprising a styrene-acrylic-based copolymer, wherein the weight ratio of the filler to binder is at least 5:1, contacting the surface and the substrate along the binder composition, and removing water from the binder composition. In some examples, the binder composition is applied to the surface and the substrate is applied to the surface along the binder composition. In some examples, the substrate is a ceramic tile.

The details of one or more embodiments are set forth in the accompanying drawings and the description below. Other features, objects, and advantages will be apparent from the description and drawings, and from the claims.

DETAILED DESCRIPTION

Figure 1:
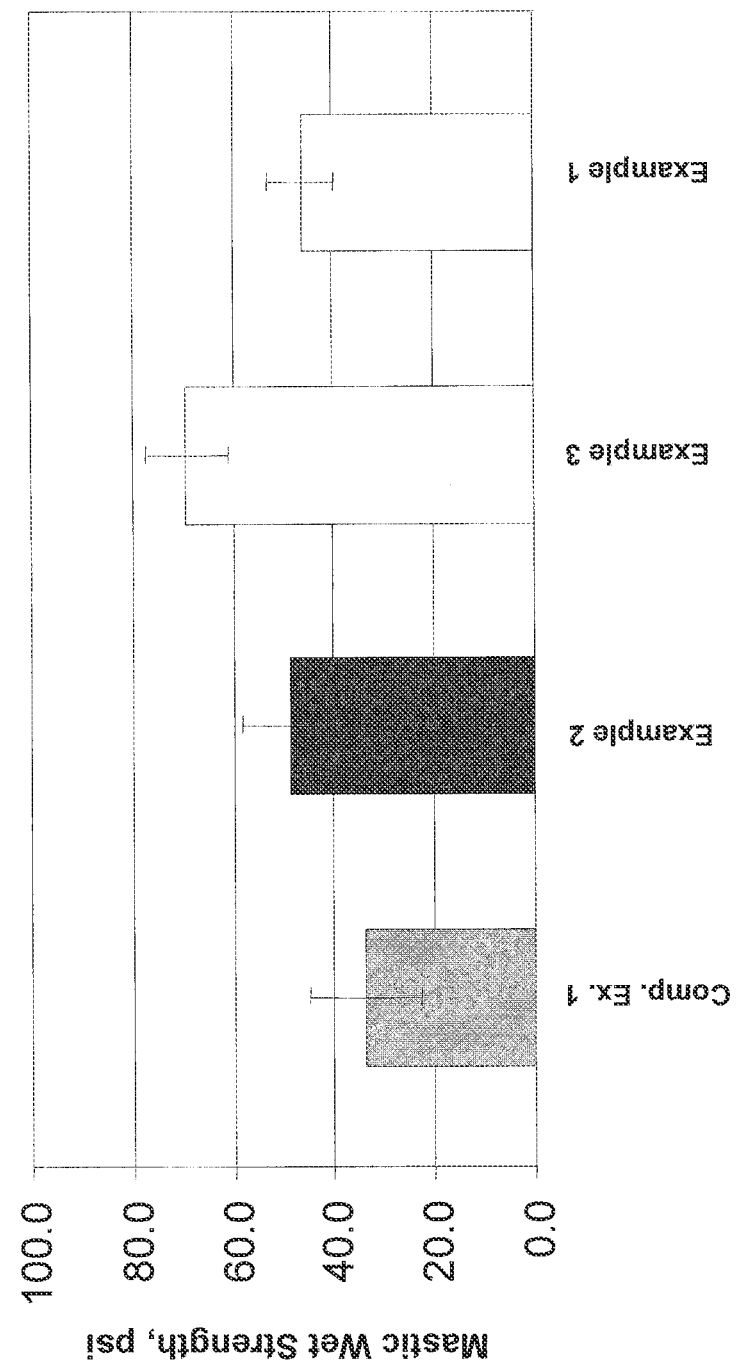
FIG. 1 is a graph illustrating the wet shear strengths of adhesives containing styrene-acrylic-based copolymers with different gel contents and with and without acetoacetoxyethyl methacrylate monomers at a 12:1 filler to binder ratio.

Styrene-acrylic-based adhesives and methods of their preparation and use are described herein. The styrene-acrylic-based adhesives can be prepared from binder compositions containing a filler and a binder comprising styrene-acrylic-based copolymers.

The styrene-acrylic-based copolymers described herein can be derived from styrene, a (meth)acrylate monomer, and at least one crosslinkable monomer. The styrene-acrylic-based copolymers can be derived from 80% by weight or greater of styrene and a (meth)acrylate monomer (e.g., from 85% by weight or greater, from 90% by weight or greater, from 95% by weight or greater, or from 99% by weight or greater of styrene and a (meth)acrylate). As used herein, the term "(meth)acrylate" includes both acrylates and methacrylates. The (meth)acrylates can include esters of $\alpha,\beta$-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{12}$, $C_1$-$C_8$, or $C_1$-$C_4$ alkanols such as ethyl, n-butyl, isobutyl and 2-ethylhexyl acrylates and methacrylates, dimethyl maleate and n-butyl maleate). Examples of (meth)acrylate monomers suitable for use in the styrene-acrylic-based copolymers include butyl acrylate, 2-ethylhexyl acrylate, ethyl acrylate, methyl methacrylate, and methyl acrylate.

The styrene-acrylic-based copolymer can further be derived from at least one crosslinkable monomer, including acetoacetate monomers, epoxy functionalized (meth)acrylate monomers, and mixtures of these. Examples of suitable acetoacetate monomers (i.e., monomers containing an acetoacetate functional group) include acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, and mixtures of these. As used herein, "epoxy functionalized (meth)acrylate monomer" refers to an acrylate or a methacrylate monomer having epoxy functionality. Suitable epoxy functionalized (meth)acrylate monomers include, for example, monomers containing glycidyl groups (e.g., glycidyl methacrylate and glycidyl acrylate) and 3,4-epoxycyclohexylmethyl(meth)acrylate. Further suitable epoxy functionalized (meth)acrylates can be prepared, for example, by treating an acrylate or a methacrylate monomer with an epoxidizing agent (e.g., an organic peracid or a hydroperoxide). In some examples, the at least one crosslinkable monomer can include acetoacetoxyethyl methacrylate and glycidyl methacrylate. The styrene-acrylic-based copolymers can be derived from 0.01% to 10% by weight of the at least one crosslinkable monomer. For example, the styrene-acrylic-based copolymer can be derived from 0.05 to 8% by weight of the at least one crosslinkable monomer, from 0.1% to 5% by weight of the at least one crosslinkable monomer, or from 0.5% to 3% by weight of the at least one crosslinkable monomer. In some examples, the styrene-acrylic-based copolymer is derived from 0.01% to 10% by weight (e.g., from 0.1 to 5%) of acetoacetoxyethyl methacrylate and glycidyl methacrylate.

In some examples, the styrene-acrylic-based copolymer is derived from 0.01 to less than 5% by weight of glycidyl methacrylate. In some embodiments, acetoacetoxyethyl methacrylate is present from an amount of 0% to 3.6% by weight (e.g., greater than 0% to 2.5% or 0.5% to 2.0%) and/or glycidyl methacrylate is present in an amount of 0% to 3.6% by weight (e.g., greater than 0% to 2.5% or 0.5% to 2.0%) based on total monomer content.

The styrene-acrylic-based copolymer can further be derived from one or more additional monomers. The one or more additional monomers can include functional groups capable of being crosslinked with the at least one crosslinkable monomer, including, for example, the acetoacetate and epoxy functionalized (meth)acrylate monomers described herein. In some examples, the one or more additional monomers with crosslinkable functional monomers include amide functionalized monomers, acid functionalized monomers, hydroxyl functionalized monomers, silane containing monomers (i.e., silanes), and mixtures of these. The one or more additional monomers can be chosen such that the additional monomer and the at least one crosslinkable monomer present in the styrene-acrylic-based copolymer are capable of interacting with one another. For example, an acid functionalized monomer such as acrylic acid can be selected a monomer for inclusion in a styrene-acrylic-based copolymer including glycidyl acrylate.

Suitable amide functionalized monomers include acrylamide, alkyl-substituted acrylamide monomers (e.g., methacrylamide, N-tert-butylacrylamide, and N-methyl(meth)acrylamide), N-methylol acrylamide, N-methylol methacrylamide, alkylaminoalkyl(meth)acrylamide, 2-dimethylaminoethyl(meth)acrylamide, 3-dimethylaminopropyl(meth)acrylamide, 3-trimethylammoniumpropyl(meth)acrylamide chloride, diacetonacrylamide, methylenebisacrylamide, and mixtures of these. In some examples, the amide monomer is present in the styrene-acrylic-based copolymer in an amount of 3% or less by weight of the total monomers present in the copolymer (i.e., based on the total weight of the monomers from which the styrene-acrylic-based copolymer is derived). For example, the amount of amide monomer present can be greater than 0%, 0.1% or greater, 0.2% or greater, 0.3% or greater, or 0.4% or greater, and/or can be 2% or less, 1.5% or less, 1.2% or less, or 1.0% or less by weight of the total monomers.

Examples of acid functionalized monomers suitable for use in the styrene-acrylic-based copolymers described herein include α,β-monoethylenically unsaturated mono- and dicarboxylic acids (e.g., acrylic acid, methacrylic acid, itaconic acid, crotonic acid, dimethacrylic acid, ethylacrylic acid, allylacetic acid, vinylacetic acid, maleic acid, fumaric acid, mesaconic acid, methylenemalonic acid, and citraconic acid); sulfonic acid monomers (e.g., allylsulfonic acid, methallylsulfonic acid, vinylsulfonic acid, allyloxybenzenesulfonic acid, and 2-acrylamido-2-methylpropanesulfonic acid); vinylphosphonic acid; acrylamidoglycolic acid; and mixtures of these. In some examples, the acid functionalized monomer is present in the styrene-acrylic-based copolymer in an amount of 3% or less by weight of the total monomers present in the copolymer (i.e., based on the total weight of the monomers from which the styrene-acrylic-based copolymer is derived). For example, the amount of acid functionalized monomer present can be greater than 0%, 0.1% or greater, 0.2% or greater, 0.3% or greater, 0.4% or greater, or 0.5% or greater, and/or 2.8% or less, 2.6% or less, 2.4% or less, 2.2% or less, 2.0% or less, 1.8% or less, 1.6% or less, 1.4% or less, 1.2% or less, or 1.0% or less by weight of the total monomers.

In some embodiments, the vinyl silane monomers suitable for use in the styrene-acrylic-based copolymers described herein include vinyl triethoxy silanes and vinyl trimethoxy silanes. In some examples, the vinyl silane monomer is present in the styrene-acrylic-based copolymer in an amount of from 0 to 2% by weight of the total monomers present in the copolymer (i.e., based on the total weight of the monomers from which the styrene-acrylic-based copolymer is derived). For example, the amount of vinyl silane monomer present can be greater than 0%, 0.1% or greater, 0.2% or greater, 0.3% or greater, or 0.4% or greater, and/or 2.0% or less, 1.5% or less, 1.0% or less, or 0.8% or less by weight of the total monomers.

Other suitable monomers including functional groups capable of being crosslinked with the at least one crosslinkable monomer include divinylbenzene; 1,4-butanediol diacrylate; methacrylic acid anhydride; monomers containing 1,3-diketo groups other than those previously described; monomers containing urea groups (e.g., ureidoethyl(meth)acrylate, and methacrylamidoglycolate methyl ether); and silane crosslinkers (e.g., 3-methacryloxypropyl trimethoxysilane and 3-mercaptopropyl trimethoxysilane). Additional examples of crosslinkers include glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates and tri(meth)acrylates). Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, and diallyl fumarate.

Further examples of additional monomers include vinyltoluenes; conjugated dienes (e.g., 1,3-butadiene or isoprene); α,β-monoethylenically unsaturated mono- and dicarboxylic acid anhydrides (e.g., maleic anhydride, itaconic anhydride, and methylmalonic anhydride); (meth)acrylonitrile; vinyl and vinylidene halides (e.g., vinyl chloride and vinylidene chloride); vinyl esters of $C_1$-$C_{18}$ mono- or dicarboxylic acids (e.g., vinyl acetate, vinyl propionate, vinyl n-butyrate, vinyl laurate and vinyl stearate); branched vinyl esters (e.g., vinyl pivalate, vinyl neo-nonanoate, vinyl 2-ethyl hexanoate, vinyl neo-decanoate, vinyl neo-undecanoate, and vinyl neo-dodecanoate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl(meth)acrylate, hydroxypropyl(meth)acrylate, and methylpolyglycol acrylate). In some embodiments, the additional monomers do not include vinyl acetate or other vinyl esters of $C_1$-$C_{18}$ mono- or dicarboxylic acids.

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., the corresponding alkali metal or ammonium salts of allylsulfonic acid, methallylsulfonic acid, styrenesulfonate, vinylsulfonic acid, allyloxybenzenesulfonic acid, 2-acrylamido-2-methylpropanesulfonic acid; sulfopropyl acrylate; and sulfopropyl methacrylate); dimethyl vinylphosphonate, and other phosphorus monomers; alkylaminoalkyl(meth)acrylates or quaternization products thereof (e.g., 2-(N,N-dimethylamino)ethyl(meth)acrylate, 3-(N,N-dimethylamino)propyl(meth)acrylate, 2-(N,N,N-trimethylammonium)ethyl(meth)acrylate chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

In some embodiments, the binder composition is substantially free of mercaptosilane or epoxysilane monomers and/or alkoxylated monomers (e.g., polyalkoxylated monomers). For example, the binder composition can include less than 0.1% or less than 0.01% mercaptosilane monomers, epoxysilane monomers, and/or alkoxylated monomers based on the weight of the binder composition.

The Tg of the copolymer can be 35° C. or less as measured using differential scanning calorimetry (DSC). For example, the Tg can be 30° C. or less, 25° C. or less, or 20° C. or less and/or the Tg can be −50° C. or greater, −40° C. or greater, −30° C. or greater or −20° C. or greater.

The styrene-acrylic-based copolymers can be prepared by polymerizing the monomers using free-radical emulsion polymerization. The emulsion polymerization temperature can be from 30° C. to 95° C. In some embodiments, the emulsion polymerization temperature can be a high temperature polymerization of 70° C. or greater (e.g., from 70° C. to 95° C.). The polymerization medium can include water alone or a mixture of water and water-miscible liquids, such as methanol. In some embodiments, water is used without additional organic solvents. The amount of water can be, for example, 60-75% by weight based on the total monomer weight. The styrene-acrylic-based copolymer can be produced using either a continuous, semi-batch (semi-continuous) or batch process. In some examples, the styrene-acrylic-based copolymer is produced using a continuous method by continuously feeding one or more monomer streams, a surfactant stream and an initiator stream to one or more reactors. The monomers in the one or more monomer streams can be fed at the desired monomer weight ratio. A seed latex can also be initially charged to the reactor. In some embodiments, the styrene-acrylic-based copolymer can be produced using a single stage polymerization, e.g., through the use of a single reactor. In addition, uniform copolymer particles can be produced (and not block copolymers or polymer particles having multiple layers (e.g. shell/core polymers)). In some embodiments, the monomers and other components of the polymerization reaction are added to the reactor over a time interval ranging from 2 to 6 hours.

The free-radical emulsion polymerization can be carried out in the presence of a free-radical polymerization initiator. At a polymerization temperature of 70° C. or greater, a thermal initiator can be used in the reactor such as ammonium and/or alkali metal peroxydisulfates (e.g., ammonium persulfate, potassium persulfate, or sodium persulfate). The thermal initiators can be employed from 0.1 to 2%, based on the total amount of the monomers to be polymerized. At temperatures of less than 70° C., the thermal initiator can be combined with or replaced by a redox initiator comprising a free radical generator, a reducing agent and an activator (e.g. a water-soluble metal salt).

Suitable free radical generators include organic peroxygen compounds such as benzoyl peroxide, hydrogen peroxide, di-t-butyl peroxide, dicumyl peroxide, 2,4-dichlorobenzoyl peroxide, decanoyl peroxide, lauroyl peroxide, diisopropylbenzene hydroperoxide, cumene hydroperoxide, p-methane hydroperoxide, α-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like; and alkyl perketals, such as 2,2-bis-(t-butylperoxy)butane, ethyl 3,3-bis(t-butylperoxy)butyrate, or 1,1-di-(t-butylperoxy)cyclohexane. In some embodiments, the free radical generator includes diisopropylbenzene hydroperoxide or p-methane hydroperoxide. The free radical generator is typically present in an amount between 0.01 and 1% by weight based on total monomer weight.

Suitable reducing agents for use in the initiator stream include sulfur dioxide; alkali metal disulfites; alkali metal and ammonium hydrogen sulfites; thiosulfate, dithionite and formaldehyde sulfoxylates; hydroxylamine hydrochloride; hydrazine sulfate; glucose and ascorbic acid. For example, the reducing agent can include sodium formaldehyde sulfoxylate dihydrate (SFS), sodium metabisulfite, or a mixture thereof. The reducing agent can be present in an amount between 0.01 and 1% by weight based on total monomer weight. In addition, the weight ratio of reducing agent to free radical generator can be between 0.2:1 and 1:1.

The water-soluble metal salt can be an iron, copper, cobalt, nickel, tin, titanium, vanadium, manganese, chromium or silver salt and can be chosen from a wide variety of water-soluble metal salts. Suitable water-soluble metal salts include copper (II) amine nitrate, copper (II) metaborate, copper (II) bromate, copper (II) bromide, copper perchlorate, copper (II) dichromate, copper (II) nitrate hexahydrate, iron (II) acetate, iron (III) bromide, iron (III) bromide hexahydrate, iron (II) perchlorate, iron (III) dichromate, iron (III) formate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahydrate, cobalt (III) chloride, cobalt (II) fluoride tetrahydride, nickel hypophosphite, nickel octanoate, tin tartrate, titanium oxalate, vanadium tribromide, silver nitrate, and silver fluosilicate. The metal can also be complexed with a compound, such as ethylenediaminetetraacetic acid (EDTA) to increase its solubility in water. For example, iron/EDTA complexes or cobalt/EDTA complexes can be used. The water-soluble metal salt can be present in an amount less than 0.01% by weight based on total monomer weight.

The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

One or more surfactants can be included in the aqueous dispersion to improve certain properties of the dispersion, including particle stability. Suitable surfactants can include anionic surfactants. As used herein, anionic surfactants refer to surfactants having one or more anionic groups including sulfonic, sulfuric, phosphoric, and carboxylic acid groups. Particular examples of anionic surfactants include alkyl sulfonates, alkyl sulfates, alkylarylsulfonates, alkylarylsulfates, fatty carboxylic acids and salts thereof, and phosphoric acid alkyl or alkylaryl esters and salts thereof. For example, sodium laureth sulfate and alkylbenzene sulfonic acid or sulfonate surfactants could be used. Examples of commercially available surfactants include DISPONIL® SDS-15, a sodium lauryl sulfate available from Cognis Corporation (Cincinnati, Ohio), and CALFAX® DB-45, a sodium dodecyl diphenyl oxide disulfonate available from Pilot Chemical Company (Cincinnati, Ohio). Further examples of suitable surfactants include non-ionic surfactants, such as alkylarylpolyethoxy alcohols, polyoxyalkylene alkyl ethers, polysorbates, alkoxylated acetylenic diols, and polysiloxane based surfactants. In general, the amount of surfactants employed can be from 0.01 to 5%, based on the total amount of the monomers to be polymerized.

In some embodiments, small amounts (e.g., from 0.01 to 2% by weight or 0.1 to 0.5% by weight based on the total monomer weight) of a molecular weight regulator, such as a mercaptan, can be used. Such substances are preferably added to the polymerization zone in a mixture with the monomers to be polymerized and are considered part of the total amount of unsaturated monomers used in the copolymer.

In some examples, the styrene-acrylic-based copolymers are single phase copolymers. As used herein, the term "single phase" refers to a homogenous system that is chemically and physically uniform. In some embodiments, the styrene-acrylic-based copolymers are substantially free from multiphase or multilayer polymers such as core-shell copolymers.

The gel content of the styrene-acrylic-based copolymers described herein can be determined in a solvent such as tetrahydrofuran (THF). The gel content of a polymer refers to the insoluble portion of the polymer in a solvent following complete immersion of the polymer film for a specified time. The gel content is the mass of the dry insoluble polymer expressed as a percentage of the original polymer mass before immersion in the solvent. The gel content of the styrene-acrylic-based copolymers described herein can be less than 75%, less than 70%, or less than 65% following immersion in THF for 2 days.

Further, the styrene-acrylic-based copolymers can include a mixture of styrene-acrylic-based copolymers. In some examples, the styrene-acrylic-based copolymers can include two or more copolymers. For example, the styrene-acrylic-based copolymers can include mixtures of styrene-acrylic-acetoacetoxyethyl methacrylate copolymers, styrene-acrylic-glycidyl methacrylate copolymers, and/or styrene-acrylic-acetoacetoxyethyl methacrylate-glycidyl methacrylate copolymers.

The binder composition can further include an external crosslinking agent. The external crosslinking agent can include a chemical reagent capable of crosslinking the functional groups present in the styrene-acrylic-based copolymer. The chemical reagent can crosslink monomers in the styrene-acrylic-based copolymer to form, for example, covalent bonds, ionic bonds, hydrogen bonds, metallic bonds, dipole-dipole interactions, and cation-pi interactions. Chemical reagents useful in the aqueous latex dispersions described herein include, for example, amines, alkyl amine salts, diamines, polyamines, polyethyleneimines, polypropyleneimines, polyamines, dihydrazides, and divalent and multivalent cations. Examples of diamines for use in the dispersions described herein include JEFFAMINE 230 (a polyether diamine commercially available from Huntsman International LLC; Salt Lake City, Utah), 4,7-dioxadecane-1,10-diamine, hexamethylene diamine, and 1,4-bisamino oxybutane. Examples of suitable polyethyleneimines include, but are not limited to, those available from BASF under the Lupasol trademark (such as LUPASOL FG, LUPASOL G20, LUPASOL G35, LUPASOL P, LUPASOL P8515, LUPASOL PS, LUPASOL SC61B, LUPASOL SK, and LUPASOL WF). Examples of suitable dihydrazides include, but are not limited to, dihydrazides of adipic acid, succinic acid, oxalic acid, glutamic acid, and sebastic acid. Examples of suitable divalent and multivalent cations include calcium, magnesium, zinc, aluminum, iron, tin, titanium, antimony, and vanadium. The chemical reagents described herein can be added to the binder composition in solid or liquid form, as a slurry, or provided in an aqueous dispersion or solution. For example, calcium can be provided as 5% calcium hydroxide slurry in water. Without wishing to be bound by a particular theory, it is believed that an external crosslinker and particularly a polyethyleneimine at a low pH leads to increased Coulombic interaction with the other binder composition components resulting in enhanced adhesive strength.

The chemical reagents for use in the binder compositions can be chosen such that the chemical reagents and the functional groups present in the styrene-acrylic-based copolymer interact with one another. For example, adipic dihydrazide can be selected and included in the binder composition as the external crosslinking agent for a binder composition including acetoacetoxyethyl methacrylate and/or glycidyl methacrylate monomers in the styrene-acrylic-based copolymer.

The acetoacetoxyethyl functional group found in acetoacetoxyethyl(meth)acrylate and other monomers described herein contains two carbonyl groups separated by an active methylene group. The reactive methylene and ketone carbonyl groups of the acetoacetyl containing monomers can be used to form further derivatives of the polymers described herein. The active methylene groups of the polymer can react with glycidyl groups emanating from the glycidyl containing monomers, by opening the epoxy ring via the hydrogen atom, to form a crosslinked polymer that can be used in the binder compositions described herein. It is contemplated that the aforementioned reactions involving the acetoacetyl groups are more efficient in the presence of highly hydrophobic comonomers, such as styrene and/or butyl acrylate, during the copolymerization of the acetoacetate moiety containing monomers due to the hydrophobicity of the former in counterbalancing the hydrophilicity of the acetoacetate moiety containing monomers. Accordingly, monomers having water solubilities less than that of styrene or butyl acrylate are also contemplated. Reactions of the glycidyl group with other functional groups present in the polymer described herein, such as carboxylic acid groups, to cause crosslinking, are also contemplated. Similarly, reactions of the acetoacetyl groups with functional groups other than glycidyl groups present in the polymer, such as carboxylic acid groups, to cause crosslinking, are also contemplated.

In the absence of or in addition to glycidyl containing monomers, chemical compounds known to crosslink with the acetoacetate moiety can be used to effect the crosslinking reaction. In the absence of or in addition to acetoacetate moiety containing monomers, chemical compounds known to crosslink with the glycidyl group can be used to effect the crosslinking reaction. Any monomers that can be copolymerized with the acetoacetate moiety containing monomers and/or the glycidyl group containing monomers are contemplated herein.

The binder compositions can also include a polyoxyethylene oxide polycarboxylic acid copolymer such as SOKALAN HP 80, commercially available from BASF Corporation. Without wishing to be bound by any particular theory, it is believed that SOKALAN HP 80 enhances the workability of adhesives having high filler to binder ratios providing better flow control for the mastic than otherwise would have been achieved in their absence, thereby increasing the contact area of the adhesive, e.g., the mastic with the tile surface, and resulting in higher adhesive strength. It also believed that this beneficial effect may increase with increasing filler to binder ratios. The binder composition can include the polyoxyethylene oxide polycarboxylic acid copolymer in an amount of less than 3%, less than 2.5%, less than 2%, less than 1.5%, or less than 1.0% by weight of the binder composition.

Coalescing agents can also be included in the binder compositions described herein. Examples of suitable coalescing agents include ester alcohols (e.g., 2,2,4-trimethyl-1,3-pentanediol monoisobutyrate), glycol ethers (e.g., ethylene glycol monomethyl ether, ethylene glycol monoethyl ether, ethylene glycol monobutyl ether, diethylene glycol monobutyl ether, diethylene glycol diethyl ether, and propylene glycol phenol ether), glycol ether acetates (e.g., diethylene glycol monoethyl ether acetate and ethylene glycol monomethyl ether acetate), and ketones (e.g., acetone, methyl ethyl ketone, methyl propyl ketone, and diacetone alcohol. A further example of a suitable coalescing agent is TEXANOL, an ester alcohol commercially available from Eastman Chemical (Kingsport, Tenn.). The binder composition can include coalescing agents in an amount of less than 3% by weight of the binder composition. In some examples, the amount of coalescing agents is less than 2% by weight of the binder composition. For example, the binder composition can include less than 1.5%, less than 1.4%, less than 1.3%, less than 1.2%, less than 1.1%, less than 1.0%, less than 0.9%, less than 0.8%, less than 0.7%, less than 0.6%, or less than 0.5% by weight of coalescing agents in the binder composition.

The styrene-acrylic-based copolymers described herein can be provided as an aqueous dispersion. The aqueous dispersion can be used, for example, to prepare products containing the copolymer.

The styrene-acrylic based copolymer dispersions can include one or more surfactants. For example, the surfactant can be a surfactant present during polymerization of the styrene-acrylic based copolymer such as the anionic and nonionic surfactants discussed above. In addition, anionic, nonionic, cationic or amphoteric surfactants can be added to the aqueous dispersion or the binder composition after polymerization of the styrene-acrylic based copolymer. Suitable anionic and nonionic surfactants include those discussed above. Cationic surfactants that can be used include, but are not limited to, the class of emulsifiers that are acid salts of primary, secondary and tertiary amines, and quaternary ammonium type emulsifiers. Typical cationic emulsifiers include cocoamine, stearylamine, N-alkyl trimethylene diamines, primary fatty amine ethylene oxide reaction products, polyoxyethylated alkylamines, amine and quaternary ammonium compounds, polyvinyl pyrrolidine, bis(2-hydroxyethyl)cocoamine oxide, bis(2-hydroxyethyl)tallow oxide and di-isobutyl phenoxy ethoxy ethyl dimethyl ammonium chloride. Examples of amphoteric surfactants that can be added to the aqueous dispersion or the binder composition include, but are not limited to alkylbetaines such as lauryl betaine, cocoamidopropyl betaine, and polyamine polybetaines. Without wishing to be bound by a particular theory, it is believed that amphoteric surfactants that are anionic at high pH and cationic at low pH result in increased Coulombic interaction between the binder composition components, such as between the polymer and the fillers, and result in enhanced adhesive strength.

As described above, the binder compositions include a styrene-acrylic-based copolymer and a filler. Examples of fillers suitable for use in the aqueous dispersions described herein include calcium carbonate, ground/recycled glass (e.g., window or bottle glass), milled glass, glass spheres, glass flakes, clays (e.g., kaolin), feldspar, mica, talc, activated carbon, metals and alloys (e.g., nickel, copper, aluminum, silicon, solder, silver, and gold), metal-plated particulates (e.g., silver-plated copper, silver-placed nickel, and silver-plated glass microspheres), sol-gel ceramics (e.g., sol-gel $SiO_2$, $TiO_2$ or $Al_2O_3$), precipitated ceramics (such as $SiO_2$, $TiO_2$ or $Al_2O_3$), fused silica, fumed silica, amorphous fused silica, aluminum trihydrate (ATH), sand, ground sand, slate dust, crusher fines, red mud, amorphous carbon (e.g., carbon black), wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof.

The binder compositions described herein can be prepared by co-polymerizing the monomers described herein to form a binder composition including the styrene-acrylic-based copolymer. In some examples, the styrene-acrylic-based copolymer includes greater than 50% by weight of the total polymer in the binder composition. For example, the binder composition can include greater than 55%, greater than 60%, greater than 70%, greater than 75%, greater than 80%, greater than 85%, greater than 90%, or greater than 95% of the styrene-acrylic-based copolymer based on the total polymer in the composition. The resulting binder composition can then be mixed with an appropriate amount of filler to provide a weight ratio of at least 5:1 filler to binder. For example, the weight ratio of the filler to the binder can be at least 6:1, at least 7:1, at least 8:1, at least 9:1, at least 10:1, at least 11:1, at least 12:1, at least 13:1, at least 14:1, or at least 15:1.

The binder compositions described herein can be used in adhesives, coatings, textiles (e.g., carpet backing), paints, foams, textiles, sound absorbing compounds, tape joint compounds, asphalt-aggregate mixtures, waterproofing membranes, and asphalt roofing compounds. In addition, the binder compositions described herein can be used to produce adhesive compositions. In some examples, the styrene-acrylic-based adhesives can be used as ceramic tile adhesives (e.g., mastics) that meet the wet shear strength requirement set forth in the American National Standard Specifications for the Installation of Ceramic Tile (ANSI A136.1 Type I and Type II) as published in 2009. The tile mastics can have a wet shear strength of at least 50 psi as measured according to the method described in ANSI A136.1. For example, the wet shear strength of the adhesive composition can be at least 52 psi, at least 54 psi, at least 56 psi, at least 58 psi, at least 60 psi, at least 62 psi, or at least 64 psi. In addition, these adhesives can be formulated with a high filler to binder ratio (e.g., at least 5:1) and a reduced amount of volatile organic compounds (VOCs), thus providing a low cost, environmentally friendly adhesive. Further, the styrene-acrylic-based adhesives possess all physical properties associated with the use of styrene-acrylic latexes, including good adhesion and water-resistance.

The binder compositions described herein can also be used to attach a substrate to a surface. In some examples, the surfaces and/or substrates can be ceramic, metal, plastic, paper, leather, wood, textile, or glass. For example, the substrate can be a ceramic tile. The binder composition can be applied to a surface and a substrate to be bonded to the surface can be applied along the binder composition. Alternatively, the binder composition can be applied to a substrate and a surface to be bonded to the substrate can be contacted along the binder composition. Water can be then removed from the composition to facilitate bonding.

The following non-limiting examples are provided to more fully illustrate some particular embodiments. Parts and percentages are provided on a per weight basis except as otherwise indicated.

EXAMPLES

Comparative Example 1

An initial charge consisting of a polystyrene seed latex, itaconic acid and TRILON BX, a chelating agent, were added to a 1-gal reactor containing deionized water. A monomer mixture was made consisting of styrene (53.5 parts), butyl acrylate (42.5 parts), tert-dodecyl mercaptan (0.1 parts), and vinyl triethoxy silane (0.6 parts). The surfactant stabilization system included CALFAX DB-45 and DISPONIL SDS-15 in water and also contained acrylic acid (1.8 parts) and acrylamide (1.2 parts). The initiator solution included sodium persulfate dissolved in water and was provided in an amount of 0.3 parts per hundred monomer.

The initial reactor contents under agitation were depleted of oxygen by a nitrogen purge and were heated to the polymerization temperature of 85° C. Once the polymerization temperature was reached, a portion of the initiator solution was added to the reactor to initiate the polymerization followed by addition of the monomer mixture, surfactant solution and initiator solution feeds to the reaction zone. The monomer mixture and surfactant solution feeds were added to the reactor over 3.5 hours and the initiator solution feed was added over 4 hours. Following completion of the feeds to the reactor, a time interval of 15 minutes was used to facilitate conversion of the monomers, and the latex was partially neutralized to a pH in the 4-6 range. Following this, a post-oxidizer solution and post-reducer solution, in separate streams, were fed to the reactor over 90 minutes to lower the residual monomer levels to acceptable levels below 400 ppm. After completion of the post-oxidizer solution and post-reducer solution feeds, the reactor was cooled to less than 30° C. and the latex was recovered. Further neutralization to a pH in the range 8.5 to 9.5 was done at room temperature. The resulting styrene-acrylic copolymer had a gel content in THF after 2 days of immersion of 76.3%.

Example 1

Example 1 was prepared using the procedure described for Comparative Example 1 except that the initiator solution was provided in an amount of 0.6 parts per hundred monomer. The resulting styrene-acrylic copolymer had a gel content in THF after 2 days of immersion of 61.0%.

Examples 2-3

Example 2 was prepared in the same manner as Example 1 except by copolymerizing 0.9% acetoacetoxyethyl methacrylate (AAEM) based on the total weight of monomers with 53.05 parts by weight of styrene and 42.05 parts by weight of butyl acrylate. Example 3 was prepared in the same manner as Example 1 except by copolymerizing 1.8% AAEM based on the total weight of monomers with 52.6 parts by weight of styrene and 41.6 parts by weight of butyl acrylate.

Comparative Example 1 and Examples 1-3 were prepared as mastic formulations with a 12:1 filler to binder ratios as shown in Table 1 below:

TABLE 1

| | Ingredients | Parts by weight |
|---|---|---|
| 1 | Polymer Dispersion* | 10.5 |
| 2 | Non-Ionic Surfactant | 0.18 |
| 3 | Defoamer | 0.1 |
| 4 | Water | 10.8 |
| 5 | Non-Ionic Surfactant | 0.8 |
| 6 | Pigment Disperser | 0.05 |
| 7 | Attapulgite Clay | 0.7 |
| 8 | Water | 7.8 |
| 9 | TEXANOL | 1.7 |
| 10 | Ethylene Glycol | 2.0 |
| 11 | Cellulose Ether Thickener | 0.6 |
| 12 | Alkali Swellable Thickener | 0.5 |
| 13 | Ammonium Hydroxide (26%) | 0.2 |
| 14 | Ground Calcium carbonate | 63.0 |
| 15 | Water (if needed) | 1.2 |
| | Total | 100.0 |

*Polymer dispersion contains 50% solids and a pH of 9.

In addition, Comparative Example 1 and Example 1 were prepared as mastic formulations with a 8:1 filler to binder ratios as shown in Table 2 below:

TABLE 2

| | Ingredients | Parts by weight |
|---|---|---|
| 1 | Polymer Dispersion* | 15.4 |
| 2 | Non-Ionic Surfactant | 0.3 |
| 3 | Defoamer | 0.1 |
| 4 | Water | 10.5 |
| 5 | Non-Ionic Surfactant | 0.4 |
| 6 | Pigment Disperser | 0.05 |
| 7 | Attapulgite Clay | 0.7 |
| 8 | Water | 4.8 |
| 9 | TEXANOL | 2.5 |
| 10 | Ethylene Glycol | 2.0 |
| 11 | Cellulose Ether Thickener | 0.5 |
| 12 | Alkali Swellable Thickener | 0.4 |
| 13 | Ammonium Hydroxide (26%) | 0.2 |
| 14 | Ground Calcium carbonate | 62.0 |
| 15 | Water (if needed) | 0.6 |
| | Total | 100.0 |

*Polymer dispersion contains 50% solids, has a pH of 9.

For both the 8:1 and 12:1 filler to binder ratios, components 1-3 were combined and agitated to form a homogeneous mixture. Components 4 and 5 were premixed and the combined components were added to the mixture, followed by component 6. Components 7 and 8 were premixed and added to the mixture, followed by a mixture of components 9-11. Component 12 was added, the mixture was stirred for 15 minutes, and component 13 was then added to adjust the pH of the mixture to 8.5-9.5. Component 14 was added and the contents were mixed until smooth and consistent. Component 15 was added in some examples to reduce the viscosity, if needed. The final mastics produced each had a pH of 8.5-9.5 and a solids content of 70-75%.

The viscosity of the each mastic was measured by a Brookfield viscometer with helipath stand (spindle TE) at a speed of 5 rpm. The mastics prepared above each had a viscosity in the 400,000-600,000 cp range, both within the target range of 350,000-700,000 cp. The mastic viscosities were measured again at the time of tile assembly. The mastics maintained viscosities within the 400,000-600,000 cp range.

Each mastic was tested for viscosity stability by conditioning the mastics at 50° C. and monitoring the mastic viscosity at time points of 1 week and 2 weeks after mastic preparation. The mastic viscosities at the 1 week and 2 week time points were compared with the viscosity at 24 hrs after mastic preparation. The mastic viscosity increase after the 2 week conditioning at 50° C. was less than 10% of the initial mastic viscosity.

In addition, the adjustment time and the open time of selected mastics formulated with the polymers described herein were measured. Adjustment time refers to the time window within which tile can be adjusted on the substrate. Open time refers to the time after applying the mastic on the substrate, and thus exposed to the atmosphere, that the mastic can still adhere (wet) at least 50% of the tile surface area. For selected mastics containing the polymers described herein and having an 8:1 filler to binder ratio, the adjustment time ranged from 40-80 minutes and the open time ranged from 35-45 minutes. For mastics containing a 12:1 filler to binder ratio, the adjustment time and open time ranged from 35-40 minutes.

For each mastic formulation, four tile-to-tile sets were assembled and each was tested according to ANSI 136.1 Type I test procedures. The tile used was a standard 4.25"×4.25" wall tile manufactured by The B+W Company (Pasadena, Calif.).

The wet shear strengths of the adhesives were measured for Comparative Example 1 and Examples 1-3 and are illustrated in FIG. 1. The value of mastic wet strength assigned to the corresponding latex was the average of the individual wet mastic strengths. The margin of error was calculated at 95% confidence for a standard normal distribution. In FIG. 1, the bars on each mastic wet shear measurement define the confidence interval for the mean value of that measurement.

As shown in FIG. 1, the wet shear strength of the adhesive produced from the styrene-acrylic-based copolymer having a lower gel content (Example 1) was higher than the higher gel content styrene-acrylic-based copolymer (Comparative Example 1) for formulations having a 12:1 filler to binder ratio. In addition, the wet shear strengths of the adhesives containing AAEM (Examples 2-3) were higher than the wet shear strength of the adhesive including the higher gel content styrene-acrylic-based copolymer and not containing AAEM (Comparative Example 1). The adhesive formulations based on Examples 1-3 met the wet shear strength requirement set forth in ANSI 136.1 (i.e., at least 50 psi).

Figure 2:
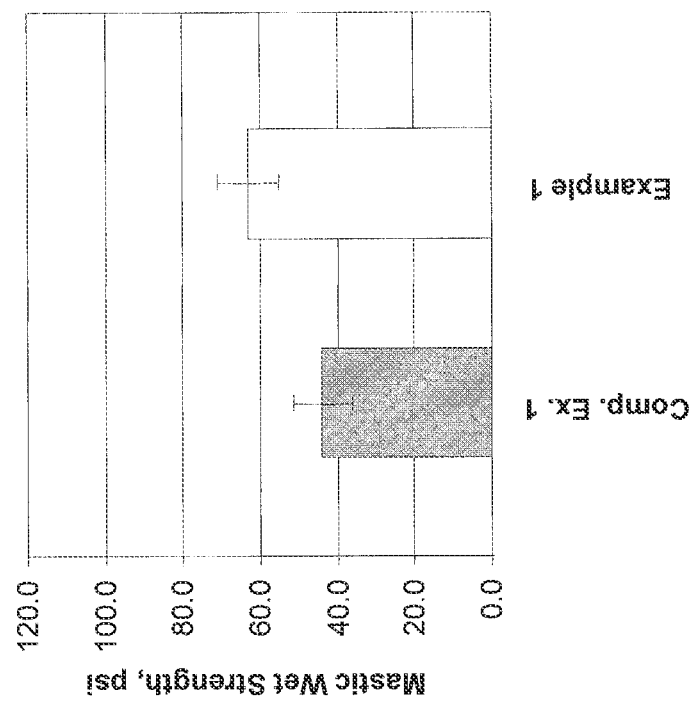
FIG. 2 is a graph illustrating the wet shear strengths of adhesives containing styrene-acrylic-based copolymers with different gel contents at a 8:1 filler to binder ratio.

As shown in FIG. 2, the wet shear strength of the adhesive produced from the styrene-acrylic-based copolymer having a lower gel content (Example 1) was also higher than the higher gel content styrene-acrylic-based copolymer (Comparative Example 1) for formulations having a 8:1 filler to binder ratio and exceeded the wet shear strength requirement set forth in ANSI 136.1 (i.e., at least 50 psi).

Examples 4-6

Figure 3:
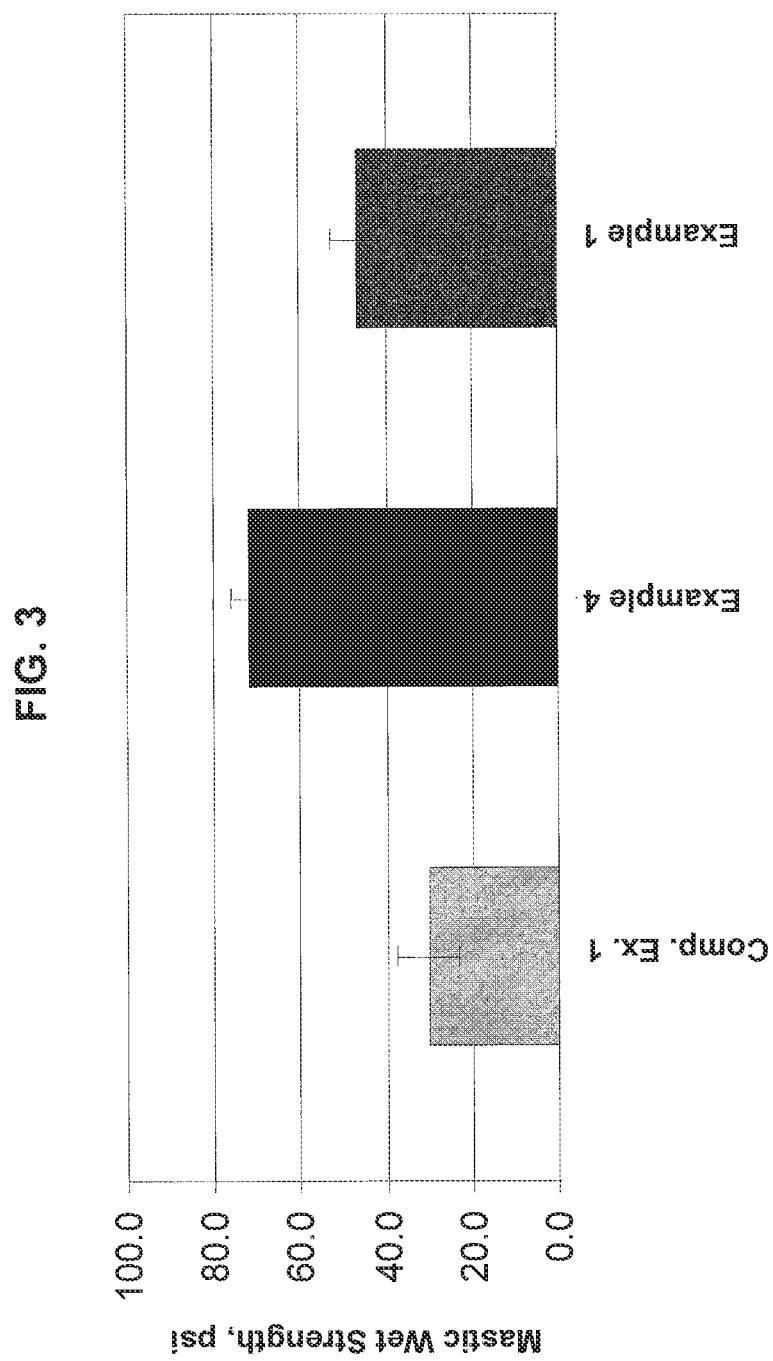
FIG. 3 is a graph illustrating the wet shear strengths of adhesives containing styrene-acrylic-based copolymers with and without glycidyl methacrylate monomers at a 12:1 filler to binder ratio.
Figure 4:
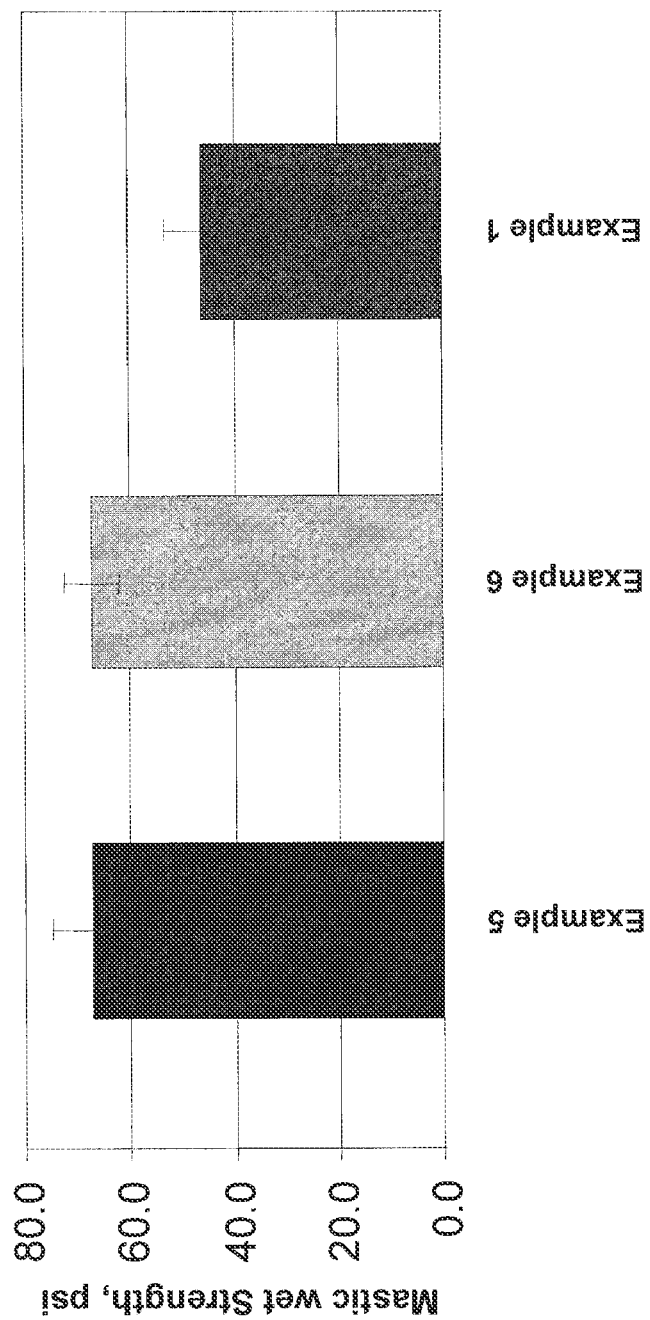
FIG. 4 is a graph illustrating the wet shear strengths of adhesives containing styrene-acrylic-based copolymers with and without glycidyl methacrylate monomers at a 12:1 filler to binder ratio.

Example 4 was prepared in the manner described above for Example 1 except by copolymerizing 1.5% glycidyl methacrylate (GMA) based on the total weight of monomers in place of equal parts of styrene and butyl acrylate (i.e. 0.75% styrene and 0.75% butyl acrylate). Examples 5 and 6 were prepared in the manner described above for Example 1 except by copolymerizing 3% and 3.5% of GMA, respectively, in place of equal parts of styrene and butyl acrylate. Examples 4-6 were prepared as adhesives with 12:1 filler to binder ratios in the manner described above. The ANSI 136.1 Type I wet shear strengths of the adhesives were measured for Examples 1 and 4-6 and compared to Comparative Example 1 and are illustrated in FIGS. 3-4. As shown in FIGS. 3-4, the wet shear strengths of the adhesives containing GMA (Examples 4-6) improved as compared to the wet shear strength of the adhesives not containing GMA (Example 1 and Comparative Example 1) for formulations having a 12:1 filler to binder ratio and met the wet shear strength requirement set forth in ANSI A136.1 (i.e., at least 50 psi). Similar results would be expected at other filler to binder ratios (e.g. 8:1).

Examples 7-8

Figure 5:
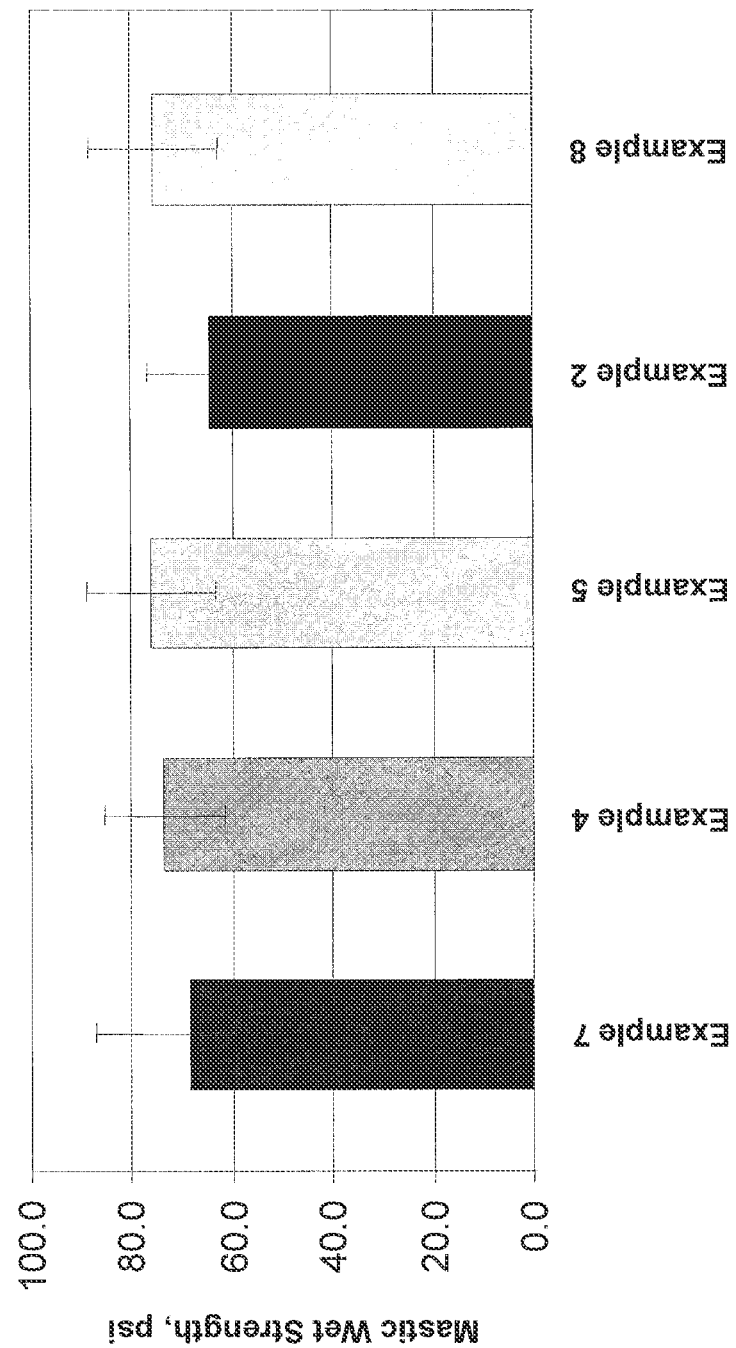
FIG. 5 is a graph illustrating the wet shear strengths of adhesives containing styrene-acrylic-based copolymers with acetoacetoxyethyl methacrylate monomers and styrene-acrylic-based copolymers with glycidyl methacrylate monomers at a 12:1 filler to binder ratio.

Example 7 was prepared in the manner described above for Example 1 except by copolymerizing 2.0% GMA based on the total weight of monomers in place of equal parts of styrene and butyl acrylate. Example 8 was prepared in the manner described above for Example 1 except by copolymerizing 2.7% AAEM based on the total weight of monomers in place of equal parts of styrene and butyl acrylate. Examples 7-8 were prepared as adhesives with 12:1 filler to binder ratios in the manner described above. The ANSI 136.1 Type I wet shear strengths of the adhesives were measured and are illustrated for Examples 2,4-5 and 7-8 in FIG. 5. As shown in FIG. 5, each of the adhesive formulations at a 12:1 filler to binder ratio containing crosslinkable monomers GMA or AAEM met the wet shear strength requirement set forth in ANSI A136.1 (i.e., at least 50 psi). Similar results would be expected at other filler to binder ratios (e.g. 8:1).

Examples 9-13

Figure 6:
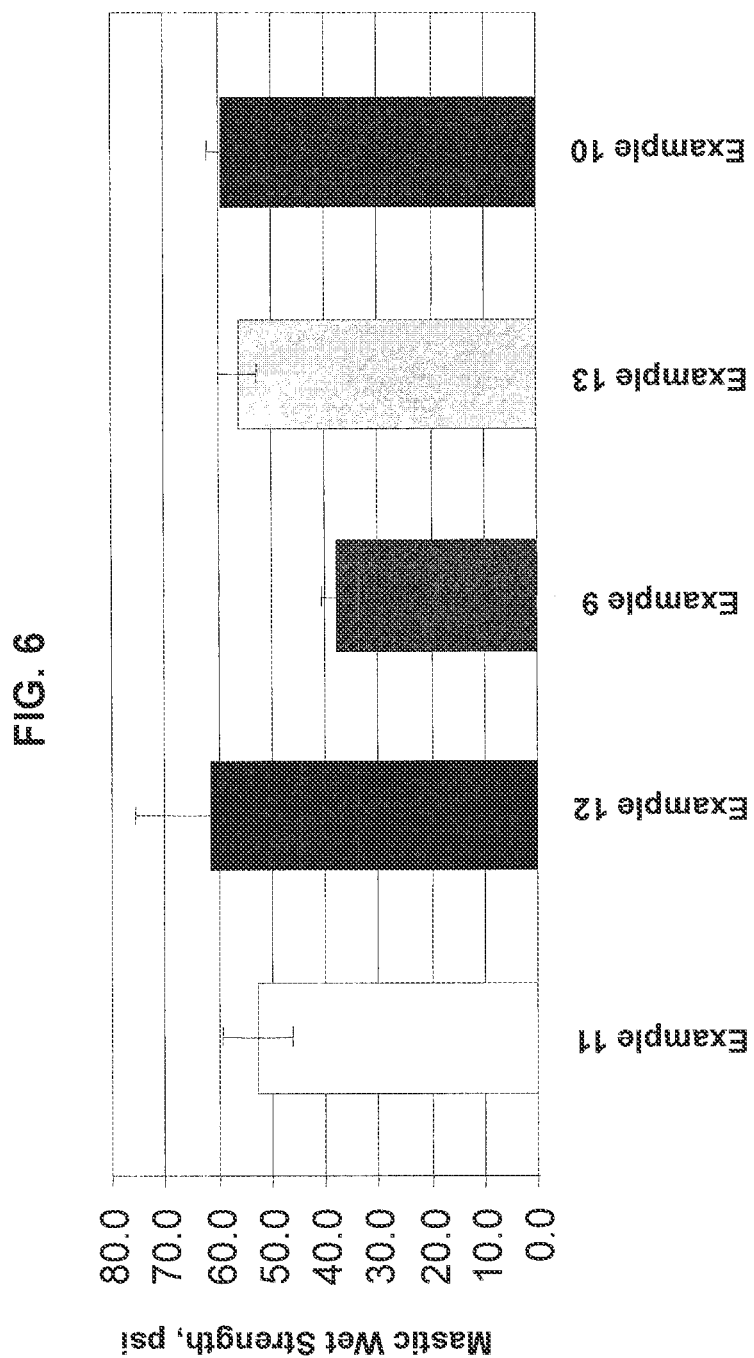
FIG. 6 is a graph illustrating the wet shear strengths of adhesives containing styrene-acrylic-based copolymers with and without acetoacetoxyethyl methacrylate monomers at a 12:1 filler to binder ratio in a heat-aged study.

Example 1 was heat aged at 50° C. for two weeks to form Example 9 and was prepared as an adhesive with a 12:1 filler to binder ratio in the manner described above. Example 10 was prepared by heat aging the mastic formulation prepared based on Example 1 at 50° C. for two weeks. Examples 11 and 12, were prepared by heat aging the copolymers of Examples 2 and 3 including 0.9% and 1.8% AAEM, respectively, at 50° C. for two weeks and preparing an adhesive with a 12:1 filler to binder ratio in the manner described above. Example 13 was prepared by heat aging the mastic formulation prepared based on Example 3 at 50° C. for two weeks. The ANSI 136.1 Type I wet shear strengths of the adhesives for Examples 9-13 were measured and are illustrated in FIG. 6. As shown in FIG. 6, the wet shear strengths of the adhesives formulated using the heat-aged latexes containing AAEM (Examples 11 and 12) improved as compared to the wet shear strength of the heat-aged adhesive formulated from the heat-aged latex not containing AAEM (Example 9). The heat-aged mastic formulations containing AAEM (Example 13) had comparable wet shear strengths to the heat-aged mastic formulation not containing AAEM (Example 10). The latex and mastic formulations containing AAEM, even after heat aging, met the wet shear strength requirement set forth in ANSI A136.1 (i.e., at least 50 psi), as well as the heat-aged mastic formulation not including AAEM (Example 10). Similar results would be expected at other filler to binder ratios (e.g. 8:1).

Examples 14-17

Figure 7:
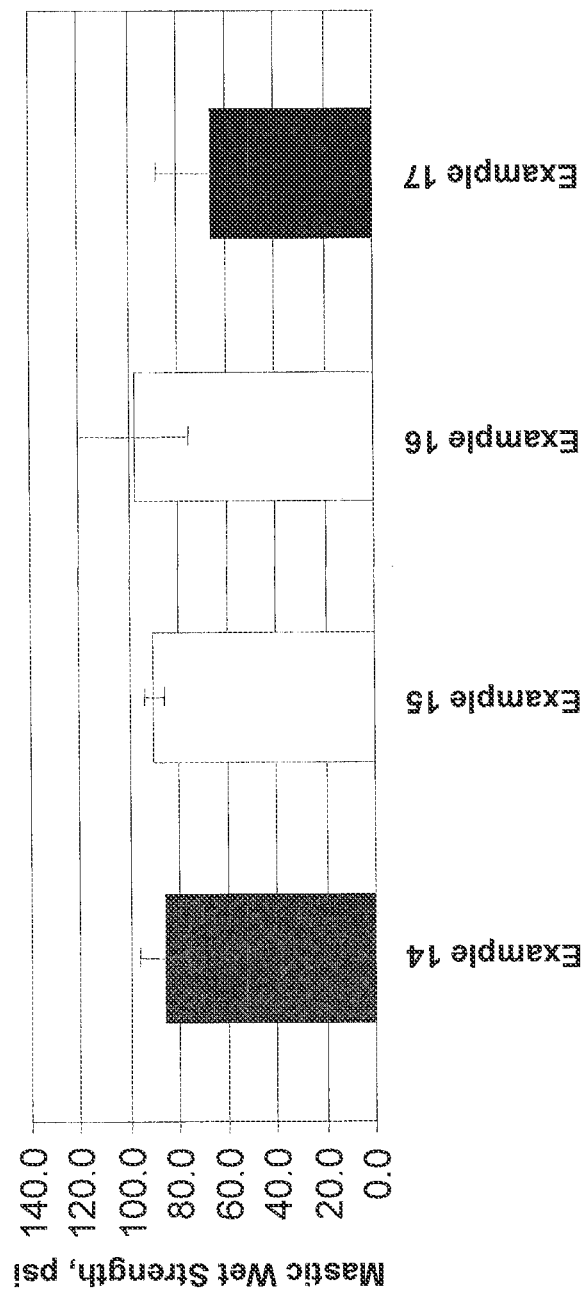
FIG. 7 is a graph illustrating the wet shear strengths of adhesives containing external crosslinkers and styrene-acrylic-based copolymers with acetoacetoxyethyl methacrylate monomers at a 12:1 filler to binder ratio.

Example 14 was prepared by copolymerizing 0.9% AAEM based on the total weight of monomers and a stoichiometric amount of adipic dihydrazide (ADDH) in place of equal parts of styrene and butyl acrylate in Example 1. Example 15 was prepared similarly to Example 14 except half of the stoichiometric amount of ADDH was copolymerized with AAEM. Examples 16 and 17 were prepared similarly to Examples 14 and 15, respectively, except 1.8% AAEM based on the total weight of monomers was used in place of equal parts of styrene and butyl acrylate. Examples 14-17 were prepared as adhesives with 12:1 filler to binder ratios in the manner described above. The ANSI 136.1 Type I wet shear strengths of the adhesives prepared from Examples 14-17 were measured and illustrated in FIG. 7. As shown in FIG. 7, each of the adhesive formulations prepared from styrene-acrylic-based copolymers containing AAEM and ADDH met the wet shear strength requirement set forth in ANSI A136.1 (i.e., at least 50 psi). Further, the wet shear strengths of the adhesives containing ADDH at a filler to binder ratio of 12:1 showed increased wet shear strengths as compared to adhesives not containing external crosslinkers (e.g., Example 2). Similar results would be expected at other filler to binder ratios (e.g. 8:1).

Examples 18-19

Figure 8:
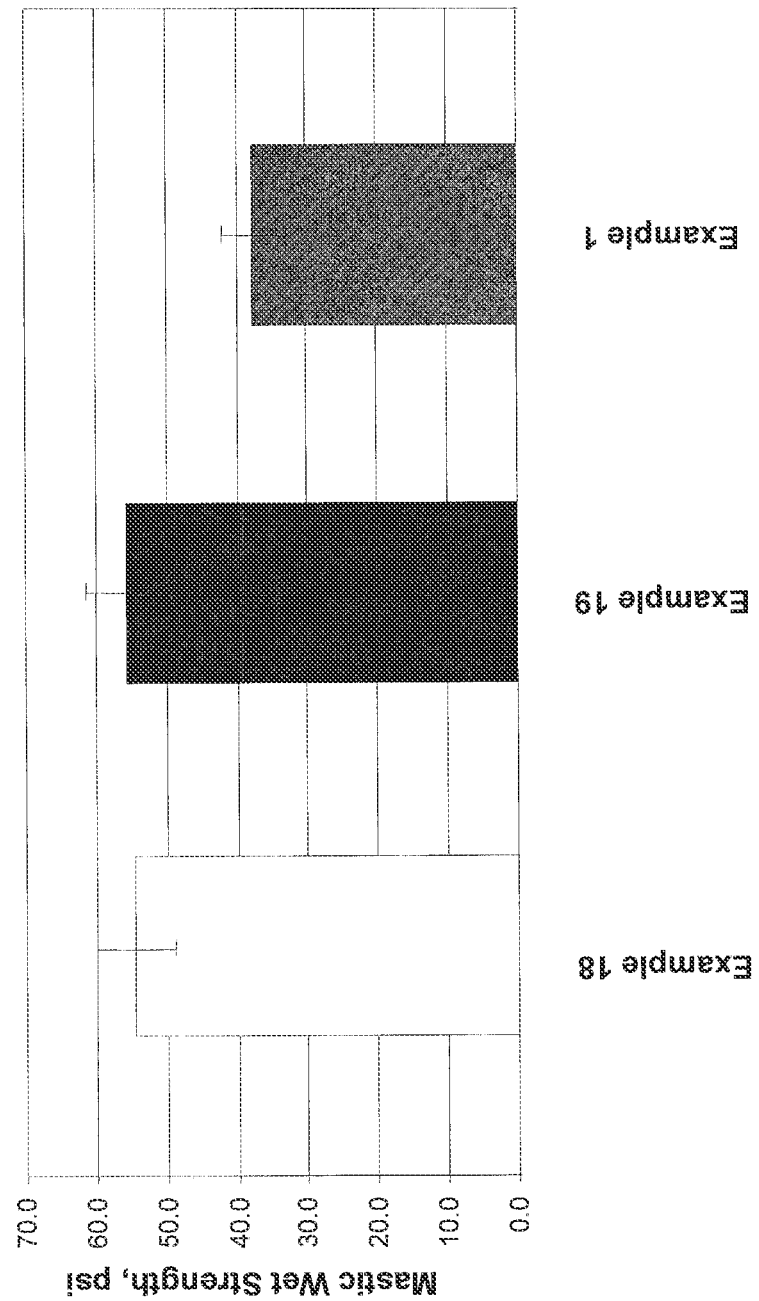
FIG. 8 is a graph illustrating the wet shear strengths of adhesives containing styrene-acrylic-based copolymers with acetoacetoxyethyl methacrylate and glycidyl methacrylate monomers at a 12:1 filler to binder ratio.

Example 18 was prepared by copolymerizing 1.8% AAEM and 1.8% GMA based on the total weight of monomers in place of equal parts of styrene and butyl acrylate in Example 1. Example 19 was prepared by copolymerizing 1.8% AAEM and 0.6% GMA based on the total weight of monomers in place of equal parts of styrene and butyl acrylate in Example 1. Examples 18-19 were prepared as adhesives with 12:1 filler to binder ratios in the manner described above. The ANSI 136.1 Type I wet shear strengths of the adhesives were measured and are illustrated in FIG. 8 along with the adhesive based on Example 1. As shown in FIG. 8, the wet shear strengths of the adhesives containing a combination of AAEM and GMA (Example 18 and Example 19) at a filler to binder ratio of 12:1 displayed increased wet shear strengths as compared to adhesives not containing these crosslinkable monomers. Moreover, the adhesive formulations containing the combination of AAEM and GMA met the wet strength requirement as regulated by ANSI A136.1 (i.e., at least 50 psi). Similar results would be expected at other filler to binder ratios (e.g. 8:1).

Example 20

Polymer A, Polymer B, Polymer C, Polymer D, Polymer E, Polymer F, Polymer G, Polymer H, and Polymer I are styrene-acrylic-based copolymers prepared by copolymerizing styrene, butyl acrylate, vinyl triethoxy silane, and one or more of acetoacetoxyethyl methacrylate (AAEM), glycidyl methacrylate (GMA), acrylic acid (AA), and acrylamide (AM), optionally in the presence of tert-dodecyl mercaptan (tddm), according to Table 3 and in the manner described above for Example 1.

TABLE 3

| Copolymer | AAEM | GMA | AA | AM | tddm |
|---|---|---|---|---|---|
| Controls 1-3 | 0 | 0 | 1.8 | 1.2 | 0.1 |
| A | 0 | 0.6 | 2.8 | 0.8 | 0.1 |
| B | 1.8 | 3.5 | 2.1 | 0 | 0.1 |
| C | 0 | 3.5 | 2.4 | 0.4 | 0.3 |
| D | 1.8 | 1.2 | 2.4 | 0.8 | 0 |
| E | 1.8 | 0.6 | 1.8 | 1.2 | 0.3 |
| F | 3.6 | 2.4 | 2.8 | 1.2 | 0 |
| G | 3.6 | 1.2 | 1.8 | 0.4 | 0.1 |

TABLE 3-continued

| Copolymer | AAEM | GMA | AA | AM | tddm |
|---|---|---|---|---|---|
| H | 1.8 | 0 | 2.8 | 0.4 | 0.2 |
| I | 3.6 | 0 | 2.1 | 0.8 | 0.3 |

Controls 1-3 were prepared as described above for Comparative Example 1. Aqueous dispersions for each of the polymers were formulated into adhesives with 12:1 filler to binder ratios in the manner described above. The ANSI 136.1 Type I wet shear strengths of the adhesives were measured and are illustrated in FIG. 9.

Figure 9:
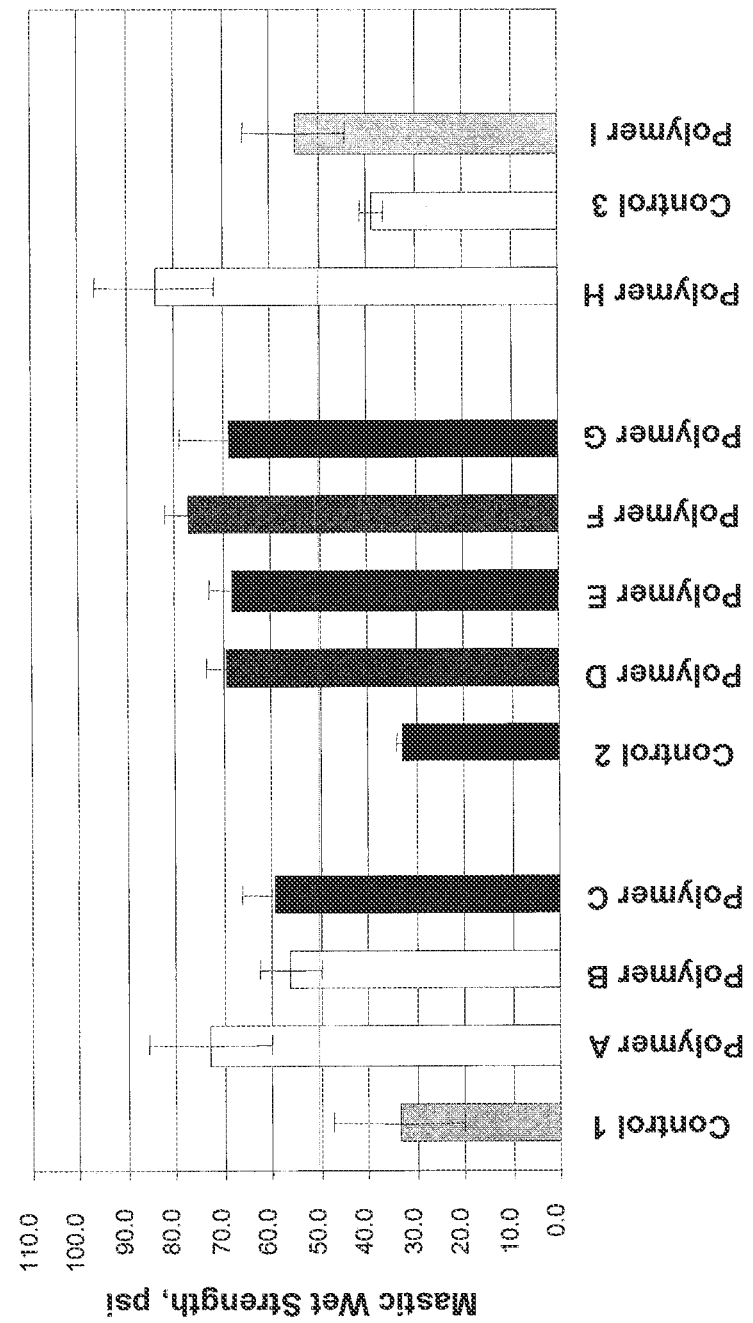
FIG. 9 is a graph illustrating the wet shear strengths of adhesives containing styrene-acrylic-based copolymers with and without acetoacetoxyethyl methacrylate, glycidyl methacrylate, acrylamide, and tert-dodecyl mercaptan and with acrylic acid, at a 12:1 filler to binder ratio.

As shown in FIG. 9, each of the adhesives prepared using one or more crosslinkable monomers (e.g., acetoacetoxyethyl methacrylate and/or glycidyl methacrylate) displayed increased wet shear strengths as compared to adhesives not containing these crosslinkable monomers. Each of the adhesive formulations including one or both of AAEM and GMA met the wet shear strength set forth in ANSI A 136.1 (i.e., at least 50 psi).

Figure 10:
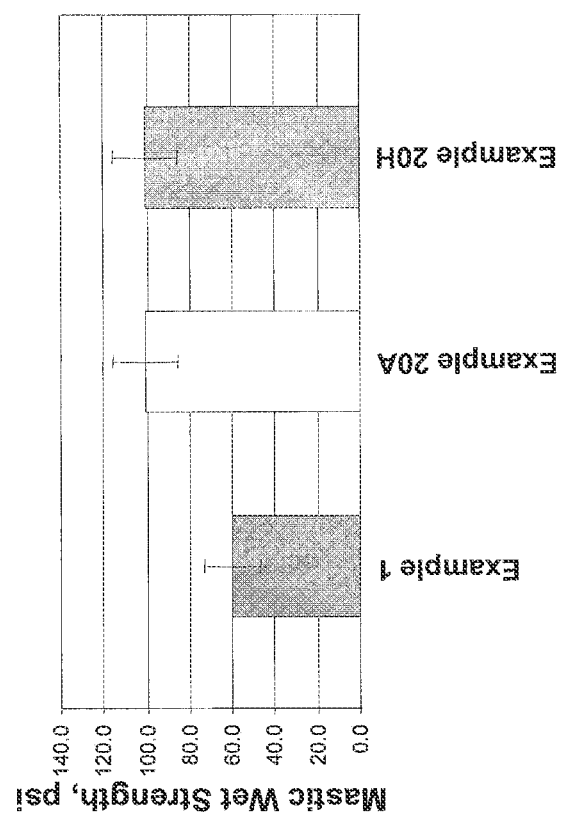
FIG. 10 is a graph illustrating the wet shear strengths of adhesives containing styrene-acrylic-based copolymers with and without acetoacetoxyethyl methacrylate and glycidyl methacrylate, and with acrylic acid, acrylamide, and tert-dodecyl mercaptan at a 8:1 filler to binder ratio.

In addition, Examples 20A and 20H were prepared as mastic formulations at a 8:1 filler to binder ratio and compared to Example 1 with a 8:1 filler to binder ratio in FIG. 10. As shown in this figure, these adhesive formulations met the wet shear strength set forth in ANSI A 136.1 (i.e., at least 50 psi) and the presence of the AAEM or GMA improved the wet shear strength.

Example 21

Figure 11:
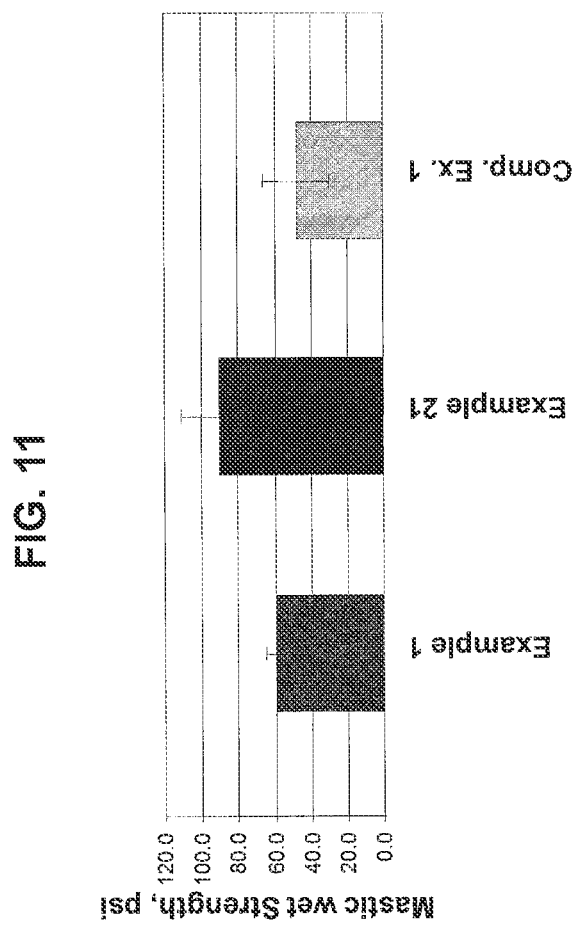
FIG. 11 is a graph illustrating the wet shear strengths of adhesives containing styrene-acrylic-based copolymers with and without polyethyleneimine at a 8:1 filler to binder ratio.

Example 21 was prepared using the procedure described above for Example 1 except that a polyethyleneimine was added in an amount of 0.3 parts per hundred monomer to the polymer dispersion. A mastic formulation having a filler to binder ratio of 8:1 was prepared and compared to mastic formulations based on Comparative Example 1 and Example 1 having a filler to binder ratio of 8:1. As shown in FIG. 11, the mastic formulation prepared using polyethyleneimine had improved wet shear strength over the mastic formulations prepared based on Comparative Example 1 and Example 1. Similar results would be expected for mastic formulations having other filler to binder ratios (e.g. 12:1).

Examples 22-23

Figure 12:
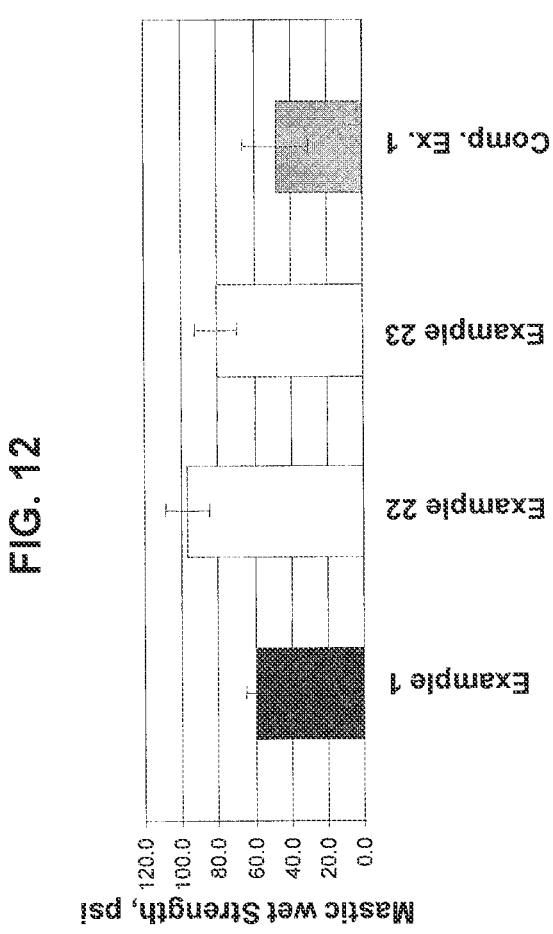
FIG. 12 is a graph illustrating the wet shear strengths of adhesives containing styrene-acrylic-based copolymers with and without an alkyl amine salt amphoteric surfactant at a 8:1 filler to binder ratio.

Examples 22-23 was prepared using the procedure described above for Example 1 except that an alkyl amine salt amphoteric surfactant was added in an amount of 1 part and 2 parts per hundred monomer, respectively, to the polymer dispersion. Mastic formulations having a filler to binder ratio of 8:1 were prepared and compared to mastic formulations based on Comparative Example 1 and Example 1 having a filler to binder ratio of 8:1. As shown in FIG. 12, the mastic formulations prepared using the amphoteric surfactant had improved wet shear strength over the mastic formulations prepared based on Comparative Example 1 and Example 1. Similar results would be expected for mastic formulations having other filler to binder ratios (e.g. 12:1).

Example 24

Figure 13:
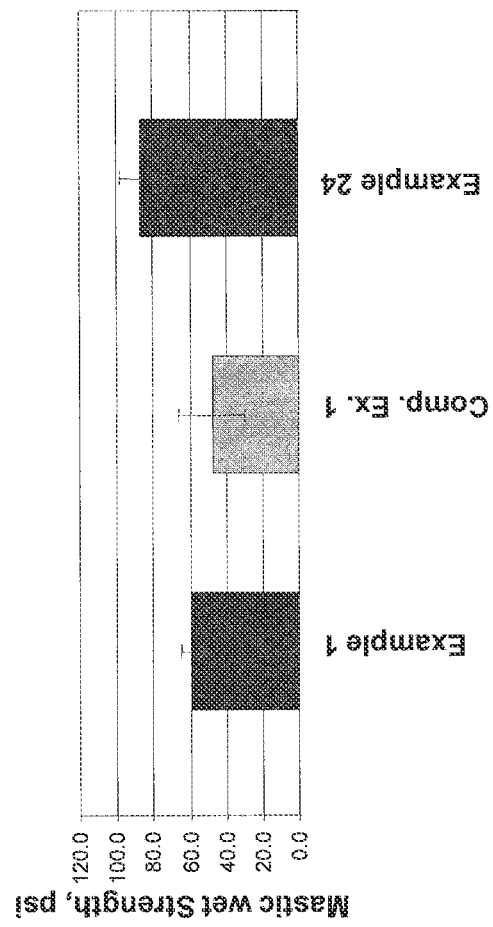
FIG. 13 is a graph illustrating the wet shear strengths of adhesives containing styrene-acrylic-based copolymers with and without a polyoxyethylene oxide polycarboxylic acid copolymer at a 8:1 filler to binder ratio.

Example 24 was prepared using the procedure described above for Example 1 except that a polyoxyethylene oxide polycarboxylic acid copolymer (SOKALAN HP 80) was added in an amount of 1 part per hundred monomer to the polymer dispersion. A mastic formulation having a filler to binder ratio of 8:1 was prepared and compared to mastic formulations based on Comparative Example 1 and Example 1 having a filler to binder ratio of 8:1. As shown in FIG. 13, the mastic formulation prepared using the polyoxyethylene oxide polycarboxylic acid copolymer had improved wet shear strength over the mastic formulations prepared based on Comparative Example 1 and Example 1. Similar results would be expected for mastic formulations having other filler to binder ratios (e.g. 12:1).

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. A binder composition, comprising:
an inorganic filler, wherein the inorganic filler is selected from the group consisting of calcium carbonate, ground/recycled glass, milled glass, glass spheres, glass flakes, clays, feldspar, mica, talc, activated carbon, metals, alloys, metal-plated particulates, sol-gel ceramics, precipitated ceramics, fused silica, fumed silica, amorphous fused silica, aluminum trihydrate, sand, ground sand, slate dust, crusher fines, red mud, amorphous carbon, wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof;
a binder comprising a styrene-acrylic-based copolymer derived from styrene and a (meth)acrylate, said styrene-acrylic-based copolymer having a gel content of greater than 40% to less than 75%; and
a nonionic surfactant in an amount of about 9% or greater by weight, based on the total weight of the styrene-acrylic-based copolymer,
wherein the weight ratio of the inorganic filler to binder is at least 12:1.

2. The binder composition of claim 1, wherein the styrene-acrylic-based copolymer is further derived from at least one crosslinkable monomer selected from the group consisting of acetoacetate monomers, epoxy functionalized (meth)acrylate monomers, and mixtures of these.

3. The binder composition of claim 1, wherein the styrene-acrylic-based copolymer has a gel content of less than 65%.

4. A binder composition, comprising:
an inorganic filler; and
a binder comprising a styrene-acrylic-based copolymer derived from styrene and a (meth)acrylate; and
a nonionic surfactant in an amount of about 9% or greater by weight, based on the total weight of the styrene-acrylic-based copolymer,
wherein the weight ratio of the inorganic filler to binder is at least 5:1, and
wherein the gel content of the styrene-acrylic-based copolymer is greater than 40% to less than 75%.

5. The binder composition of claim 4, wherein the styrene-acrylic-based copolymer has a gel content of from 61% to less than 75%.

6. The binder composition of claim 4, wherein the inorganic filler to binder ratio is at least 8:1.

7. The binder composition of claim 4, wherein the inorganic filler to binder ratio is at least 12:1.

8. The binder composition of claim 4, wherein the (meth)acrylate is selected from the group consisting of butyl acrylate, 2-ethylhexyl acrylate, ethyl acrylate, methyl methacrylate, methyl acrylate, and mixtures of these.

9. The binder composition of claim 4, wherein the styrene-acrylic-based copolymer is derived from 90% by weight or greater of styrene and the (meth)acrylate.

10. The binder composition of claim 4, wherein the styrene-acrylic-based copolymer further comprises at least one crosslinkable monomer selected from acetoacetate monomers, epoxy functionalized (meth)acrylate monomers, and mixtures of these.

11. The binder composition of claim 4, wherein the styrene-acrylic-based copolymer further comprises one or more additional monomers that include crosslinkable functional monomers selected from the group consisting of acrylamide, methacrylamide, N-methylol acrylamide, acrylic acid, methacrylic acid, itaconic acid, or mixtures of these.

12. The binder composition of claim 10, wherein the at least one crosslinkable monomer includes an acetoacetate monomer comprising acetoacetoxyethyl methacrylate.

13. The binder composition of claim 10, wherein the at least one crosslinkable monomer includes an epoxy functionalized (meth)acrylate monomer comprising glycidyl methacrylate.

14. The binder composition of claim 10, wherein the at least one crosslinkable monomer includes acetoacetoxyethyl methacrylate and glycidyl methacrylate.

15. The binder composition of claim 6, further comprising an external crosslinking agent selected from the group consisting of an amine, an alkyl amine salt, a diamine, a polyethyleneimine, a polypropyleneimine, a polyamine, a dihydrazide, or mixtures of these.

16. An adhesive comprising the binder composition of claim 4.

17. A method of preparing a binder composition, comprising:
co-polymerizing styrene and a (meth)acrylate to form a binder comprising a styrene-acrylic-based copolymer; and
mixing the binder with an inorganic filler to provide at least a 5:1 weight ratio of the inorganic filler to binder and a nonionic surfactant in an amount of about 9% or greater by weight, based on the total weight of the styrene-acrylic-based copolymer,
wherein the styrene-acrylic-based copolymer has a gel content of greater than 40% to less than 75%.

18. A method of preparing a binder composition, comprising:
co-polymerizing styrene and a (meth)acrylate to form a binder comprising a styrene-acrylic-based copolymer, wherein said styrene-acrylic-based copolymer has a gel content of greater than 40% to less than 75%; and
mixing the binder with an inorganic filler to provide at least a 12:1 weight ratio of the inorganic filler to binder and a nonionic surfactant in an amount of about 9% or greater by weight, based on the total weight of the styrene-acrylic-based copolymer,
wherein the inorganic filler is selected from the group consisting of calcium carbonate, ground/recycled glass, milled glass, glass spheres, glass flakes, clays, feldspar, mica, talc, activated carbon, metals, alloys, metal-plated particulates, sol-gel ceramics, precipitated ceramics, fused silica, fumed silica, amorphous fused silica, aluminum trihydrate, sand, ground sand, slate dust, crusher fines, red mud, amorphous carbon, wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof.

19. A method of adhering a substrate to a surface, comprising the steps of:
(1) applying to a surface or to a substrate a binder composition, comprising water, an inorganic filler, a binder comprising a styrene-acrylic-based copolymer, and a nonionic surfactant in an amount of about 9% or greater by weight, based on the total weight of the styrene-acrylic-based copolymer, wherein the weight ratio of the inorganic filler to binder is at least 12:1, the styrene-acrylic-based copolymer has a gel content of greater than 40% to less than 75%, and the inorganic filler is selected from the group consisting of calcium carbonate, ground/recycled glass, milled glass, glass spheres, glass flakes, clays, feldspar, mica, talc, activated carbon, metals, alloys, metal-plated particulates, sol-gel ceramics, precipitated ceramics, fused silica, fumed silica, amorphous fused silica, aluminum trihydrate, sand, ground sand, slate dust, crusher fines, red mud, amorphous carbon, wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof;
(2) contacting the surface and the substrate along the binder composition; and
(3) removing water from the binder composition.

20. The binder composition of claim 4, wherein the styrene-acrylic-based copolymer has a gel content of from 45% to less than 75%.

21. The method of claim 19, wherein the wet shear strength of the binder composition is at least 50 psi when used to bond a ceramic tile to a surface according to ANSI A 136.1 (2009).

22. The binder composition of claim 1, wherein the nonionic surfactant is in an amount of from about 9% to about 19% by weight, based on the total weight of the styrene-acrylic-based copolymer.

23. The binder composition of claim 1, wherein the nonionic surfactant is in an amount of from 9.1% to 18.6% by weight, based on the total weight of the styrene-acrylic-based copolymer.

24. The binder composition of claim 4, wherein the nonionic surfactant is in an amount of from about 9% to about 19% by weight, based on the total weight of the styrene-acrylic-based copolymer.

25. The binder composition of claim 4, wherein the nonionic surfactant is in an amount of from 9.1% to 18.6% by weight, based on the total weight of the styrene-acrylic-based copolymer.

26. The binder composition of claim 5, wherein the nonionic surfactant is in an amount of from 9.1% to 18.6% by weight, based on the total weight of the styrene-acrylic-based copolymer.

27. The method of claim 17, wherein the nonionic surfactant is in an amount of from 9.1% to 18.6% by weight, based on the total weight of the styrene-acrylic-based copolymer.

28. The method of claim 18, wherein the nonionic surfactant is in an amount of from 9.1% to 18.6% by weight, based on the total weight of the styrene-acrylic-based copolymer.

29. The method of claim 19, wherein the nonionic surfactant is in an amount of from 9.1% to 18.6% by weight, based on the total weight of the styrene-acrylic-based copolymer.

* * * * *